(12) United States Patent
Oyama et al.

(10) Patent No.: US 7,094,123 B2
(45) Date of Patent: Aug. 22, 2006

(54) METHOD OF MANUFACTURING AN ELECTRON EMITTING DEVICE WITH CARBON NANOTUBES

(75) Inventors: Kazunari Oyama, Kanagawa (JP); Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/050,590

(22) Filed: Feb. 3, 2005

(65) Prior Publication Data

US 2005/0153619 A1    Jul. 14, 2005

Related U.S. Application Data

(62) Division of application No. 10/237,677, filed on Sep. 10, 2002, now abandoned.

(30) Foreign Application Priority Data

Sep. 10, 2001 (JP) .............................. 2001-274057
Aug. 23, 2002 (JP) .............................. 2002-243203

(51) Int. Cl.
*H01J 9/04* (2006.01)
*G01J 1/05* (2006.01)

(52) U.S. Cl. ........................................ 445/50; 313/311

(58) Field of Classification Search .................. 445/50
See application file for complete search history.

(56) References Cited

U.S. PATENT DOCUMENTS

| | | | |
|---|---|---|---|
| 4,728,851 A | 3/1988 | Lambe | 313/309 |
| 4,904,895 A | 2/1990 | Tsukamoto et al. | 313/336 |
| 5,313,136 A | 5/1994 | Van Gorkom et al. | 313/422 |
| 5,347,199 A | 9/1994 | Van Gorkom et al. | 315/169.1 |
| 5,386,175 A | 1/1995 | Van Gorkom et al. | 313/422 |
| 5,442,253 A | 8/1995 | Van Gorkom et al. | 313/422 |
| 5,489,815 A | 2/1996 | Van Gorkom et al. | 313/422 |
| 5,497,046 A | 3/1996 | Van Gorkom et al. | 313/422 |
| 5,525,873 A | 6/1996 | Lambert et al. | 315/366 |
| 5,557,296 A | 9/1996 | Lambert et al. | 345/74 |
| 5,563,470 A | 10/1996 | Li | 313/496 |
| 5,598,054 A | 1/1997 | Trompenaars et al. | 313/422 |
| 5,621,271 A | 4/1997 | Trompenaars et al. | 313/422 |
| 5,625,253 A | 4/1997 | Van Gorkom et al. | 313/422 |
| 5,637,954 A | 6/1997 | Van Gorkom et al. | 313/422 |
| 5,701,134 A | 12/1997 | Lambert et al. | 345/74 |

(Continued)

FOREIGN PATENT DOCUMENTS

CN        1048276 A        1/1991

(Continued)

OTHER PUBLICATIONS

J. M. Bonard et al., *Field Emission from Carbon Nanotubes: The First Five Years*, Solid State Electronics, vol. 45, pp. 893-914 (2001).

(Continued)

*Primary Examiner*—Mariceli Santiago
*Assistant Examiner*—Anne M Hines
(74) *Attorney, Agent, or Firm*—Fitzpatrick, Cella, Harper & Scinto

(57) ABSTRACT

There is provided a method of manufacturing an electron emitting device by disposing a substrate with a catalytic metal film inside a reaction vessel; feeding hydrogen gas and hydrocarbon gas simultaneously into the reaction vessel at a temperature close to room temperature; raising the temperature inside the reaction vessel; and producing carbon fibers by keeping the temperature inside the reaction vessel substantially constant.

3 Claims, 10 Drawing Sheets

U.S. PATENT DOCUMENTS

| | | | |
|---|---|---|---|
| 5,721,468 A | 2/1998 | De Zwart et al. | 313/422 |
| 5,723,940 A | 3/1998 | Van Gorkom et al. | 313/422 |
| 5,764,205 A | 6/1998 | Doyle et al. | 345/75 |
| 5,844,354 A | 12/1998 | De Zwart et al. | 313/422 |
| 5,872,422 A | 2/1999 | Xu et al. | 313/311 |
| 5,903,094 A | 5/1999 | Van Gorkom et al. | 313/422 |
| 5,966,109 A | 10/1999 | De Zwart et al. | 345/75 |
| 5,973,444 A | 10/1999 | Xu et al. | 313/309 |
| 5,982,091 A | 11/1999 | Konishi | 313/495 |
| 5,986,389 A | 11/1999 | Tsukamoto | 313/310 |
| 5,986,627 A | 11/1999 | De Zwart et al. | 345/75 |
| 6,045,769 A | 4/2000 | Kambe et al. | 423/447.3 |
| 6,087,765 A | 7/2000 | Coll et al. | 313/309 |
| 6,147,449 A | 11/2000 | Iwasaki et al. | 313/495 |
| 6,184,610 B1 | 2/2001 | Shibata et al. | 313/309 |
| 6,188,178 B1 | 2/2001 | Van Gorkom et al. | 315/169.1 |
| 6,246,168 B1 | 6/2001 | Kishi et al. | 313/495 |
| 6,288,494 B1 | 9/2001 | Tsukamoto et al. | 315/169.1 |
| 6,361,861 B1 | 3/2002 | Gap et al. | 428/367 |
| 6,472,814 B1 | 10/2002 | Yamanobe et al. | 313/495 |
| 6,522,055 B1 | 2/2003 | Uemura et al. | 313/310 |
| 6,626,719 B1 | 9/2003 | Ono et al. | 445/24 |
| 6,843,696 B1 | 1/2005 | Kitamura et al. | 445/24 |
| 6,848,962 B1 | 2/2005 | Kitamura et al. | 445/24 |
| 2001/0004979 A1 | 6/2001 | Han et al. | 257/164 |
| 2001/0006232 A1 | 7/2001 | Choi et al. | 257/10 |
| 2001/0028209 A1 | 10/2001 | Uemura et al. | 313/311 |
| 2002/0009637 A1 | 1/2002 | Murakami et al. | 429/213 |
| 2002/0047513 A1 | 4/2002 | Nomura | 313/495 |
| 2002/0057045 A1 | 5/2002 | Tsukamoto | 313/309 |
| 2002/0060516 A1 | 5/2002 | Kawate et al. | 313/495 |
| 2002/0074947 A1 | 6/2002 | Tsukamoto | 315/169.3 |
| 2003/0006684 A1 | 1/2003 | Kawate et al. | 313/311 |
| 2003/0013372 A1 | 1/2003 | Uemura et al. | 445/24 |
| 2003/0048055 A1 | 3/2003 | Ishikura et al. | 313/311 |
| 2003/0057860 A1 | 3/2003 | Tsukamoto | 315/169.3 |
| 2003/0143398 A1 | 7/2003 | Ohki et al. | 428/396 |
| 2003/0222560 A1 | 12/2003 | Roach | 313/311 |

FOREIGN PATENT DOCUMENTS

| | | |
|---|---|---|
| CN | 1309408 A | 8/2001 |
| EP | 0 290 026 A1 | 11/1988 |
| EP | 0 535 953 A2 | 4/1993 |
| EP | 0 535 953 A3 | 4/1993 |
| EP | 1 069 587 A2 | 1/2001 |
| EP | 1 113 478 | 7/2001 |
| EP | 1 122 344 | 8/2001 |
| EP | 1 122 344 A2 | 8/2001 |
| EP | 1 126 494 A1 | 8/2001 |
| EP | 1 122 344 A3 | 1/2002 |
| EP | 1 187 161 | 3/2002 |
| EP | 1 187 161 A3 | 4/2003 |
| JP | 06-002222 | 1/1994 |
| JP | 08-115652 | 5/1996 |
| JP | 10-199398 | 7/1998 |
| JP | 2002-208028 | 7/2000 |
| JP | 2001-15077 | 1/2001 |
| JP | 2001-19413 | 1/2001 |
| JP | 2001-101966 | 4/2001 |
| WO | WO 99/65821 A1 | 12/1999 |
| WO | 01/93292 A1 | 12/2001 |
| WO | WO 02/30816 A1 | 4/2002 |

OTHER PUBLICATIONS

New Progress in Investigation of Carbon Nanotubes Array (with abstract and a partial translation) (Apr. 1996).

CROSS-SECTION TAKEN ALONG LINE A-A dev# METHOD OF MANUFACTURING AN ELECTRON EMITTING DEVICE WITH CARBON NANOTUBES This application is a division of U.S. application Ser. No. 10/237,677, filed Sep. 10, 2002, now abandoned.

BACKGROUND OF THE INVENTION

1. Field of the Invention

The present invention relates to an electron emitting device using carbon fiber, electron source, image display device, method of manufacturing the electron emitting device, method of manufacturing electron source using the electron emitting device, and method of manufacturing image display device.

2. Description of the Related Art

In recent years, a wide variety of researches have been underway on fibrous carbon materials having an individual diameter in order of nanometer. Typically, a carbon nanotube is cited as an example of the fibrous carbon materials (carbon fibers).

The carbon nanotube is referred to as a fullerene having a cylindrical structure of a single layer or several layers of a graphite being wound, which is a new carbon material discovered in 1991 (refer to Nature, 354, (1991) 56).

The carbon nanotube has a cylindrically formed graphene. The carbon nanotube having a single layer of a cylindrical graphene sheet is called a single-wall nanotube, and the one having multiple layers of the cylindrical graphene sheets is called a multi-wall nanotube.

The carbon nanotube is characterized by such a form featuring a high aspect ratio and chemically outstanding durability. Because of this, low-vacuum driving is practicable at a low voltage, and yet, utilization as a source material of a cold cathode durable for long-term service is anticipated.

Typically, the method of manufacturing the above-described carbon nanotube includes the following: an electrophoretic deposition, thermal CVD (chemical vapor deposition) method, plasma CVD method, arc discharge method, and laser vaporization method.

In particular, since the thermal CVD method implements a synthesis method via chemical processes, a scale thereof can easily be expanded. Further, since this method utilizes hydrocarbon or the like as a raw material (synthesis gas), it is quite appropriate for mass production of the above carbon nanotube at a low cost.

For example, according to JP 07-197325 A and JP 09-188509 A, a method of manufacturing single-layer carbon nanotube by way of utilizing metallic catalyst such as iron, cobalt, or nickel, was proposed.

Further, those publications including 1996 "Science", vol. 273, page 483, JP 2000-095509 A, and "Applied Physics Letters" 76 (2000) pp. 2367–2369, respectively reported on the vapor deposition method for manufacturing the carbon nanotube via utilization of catalyst.

SUMMARY OF THE INVENTION

However, in the case of such an electron source comprising plural arrays of electron emitting devices each incorporating a number of carbon fibers which are electrically linked with cathodes, there were a variety of problems to solve as described below.

Although carbon fibers are individually distinguished in the electron emitting characteristics, in the case of emitting electrons, there are variations of electron emitting characteristics between a number of individual carbon fibers which constitute one electron emitting device. Further, there was even a case in which variations were generated in the electron emitting characteristics between electron emitting devices. Because of this, when operating a display utilizing such an electron source for example, there were many cases in which luminance itself became uneven.

In regard to electron emitting characteristics, even though the initial characteristics were quite satisfactory, it was not always possible to sustain satisfactory characteristics for a long service duration.

As a result of intensive research, inventors eventually detected that variation of the electron emitting characteristics via time passage and the difference of the characteristics between individual electron emitting devices were dependent on the degree of spreading of a diameter distribution of the carbon fibers. The reason is conceived to be as follows.

Concretely, when the diameter distribution spreads, a stronger electric field is applied to the carbon fibers having a small diameter than those having a large diameter. As a result, electrons are preferentially emitted from those carbon fibers having the small diameters. This in turn obstructs uniform emission of electrons between electron emitting devices and also between a number of carbon fibers for constituting one electron emitting device as well.

Because of the above reason, when applying a plurality of carbon fibers to a display device, there may occur a problem in that light is unevenly emitted or images are unevenly formed.

In the above case, only those carbon fibers with small diameters continuously emit electrons, and thus, they are easily subject to degradation via a long-term driving duration. This in turn intensifies variation of threshold values in the emission of electrons.

Further, there may be a problem in that the amount of electron emission suddenly increases at such a portion (carbon fibers with small diameters) at which electrons are intensely emitted, and then, a plurality of carbon fibers arround said portion (carbon fibers with small diameters) will be instantaneously destroyed.

On the other hand, in such a case in which the diameter distribution is narrow, this facilitates even emission of electrons from individual carbon fibers. It is thus conceived that the above-described adverse influence will be minimized.

Because of the above reasons, in the case of the electron emitting device utilizing a substantial number of carbon fibers, suppression of the spreading of diameter distribution becomes extremely effective means for realizing electron emission based on higher uniformity.

The present invention has been achieved in consideration of the above circumstances. Therefore, an object of the present invention is to provide an electron emitting device featuring distinguished physical characteristics in the emission of electrons, higher durability, and capability to realize uniform emission of electrons within a surface. Further, the present invention also provides a method of manufacturing an electron emitting device, a method of manufacturing an electron source, a method of manufacturing an image display device, and a method of manufacturing carbon fibers.

In order to achieve the above object, according to the present invention, there is provided an electron emitting device comprising a plurality of carbon fibers, wherein a mean diameter value of the plurality of carbon fibers is in a range from a minimum of 10 nm to a maximum of 100 nm, and a standard deviation of a diameter distribution is equal to or less than 30% of the mean diameter value, more preferably equal to or less than 15% thereof.

The present invention utilizes a bundle of carbon fibers (bunch of carbon fibers) as electron emitting members of an electron emitting device, thereby making it possible to realize such an electron emitting device featuring distinguished physical characteristics in the emission of electrons and high resistance against degradation, in which an individual carbon fiber has a mean diameter ranging from 10 nm to 100 nm, where standard deviation of a diameter distribution is rated to be equal to or less than 30% of the averaged diameter, preferably equal to or less than 15% thereof.

In the bundle of such carbon fibers each having the average diameter of equal to or less than 10 nm, it is quite difficult to realize stable electron emission. On the other hand, in a bundle of such carbon fibers each having the average diameter of equal to or more than 100 nm, because of a small aspect ratio of the carbon fiber, it is not possible to secure satisfactory electron emission characteristics.

In such a case in which standard deviation of the diameter distribution exceeds 30%, an electric field is solely applied to the partial carbon fibers each bearing a high aspect ratio. This in turn obstructs uniform emission of electrons from the bundle of carbon fibers, thus causing them to incur degradation very soon.

Considering the above physical condition, the present invention provides a method of manufacturing an electron emitting device comprising: disposing a substrate with a catalytic metal film inside a reaction vessel; introducing (feeding) hydrogen gas and hydrocarbon gas substantially simultaneously into the reaction vessel at a temperature close to a room temperature; raising the temperature inside the reaction vessel; and producing a plurality (bundle) of carbon fibers by way of keeping the temperature inside the reaction vessel to be substantially constant within a range from 400° C. to 600° C.

When simultaneously feeding hydrogen gas and hydrocarbon gas into the reaction vessel at temperature close to the room temperature (between 10° C. and 40° C.), it is possible to restrict the diameters of carbon fibers in the bundle generated on the substrate and restrict the diameter distribution. On the other hand, in the case of introducing (feeding) either or both of hydrogen gas and hydrocarbon gas into the reaction vessel at a high temperature, the individual diameters of carbon fibers and the diameter distribution of carbon fibers tend to expand when introducing temperatures of the respective gases (hydrogen gas and hydrocarbon gas) are higher and difference between the respective introducing temperatures of the gases is larger.

In consideration of the above physical characteristics, by properly controlling inflow temperature of hydrogen gas and hydrocarbon gas, it is possible for the present invention to precisely control the diameters of the individual carbon fibers and the diameter distribution thereof as well.

By implementing the method of manufacturing an electron emitting device according to the present invention, it is possible to secure the bundle of carbon fibers each being controlled so as to bear a small diameter and a narrow diameter distribution.

Because of the simplified method of manufacturing the above electron emitting device, the inventive method is appropriate for implementing mass production at a low cost.

To compose the above-described catalytic metal thin film, the inventive method utilizes palladium (Pd) or an alloy material containing Pd, in which the alloy material containing Pd further comprises at least such an ingredient selected from the group consisting of Fe, Co, and Ni.

Palladium (Pd) exerts significant catalytic function in the reaction to decompose hydrocarbon and can decompose hydrocarbon at a low temperature. Because of this, compared to the case of solely using Fe as a catalytic material, by utilizing palladium as the catalytic material to form the carbon fibers, it is possible to produce the bundle of carbon fibers (plurality of carbon fibers) at a still lower temperature.

In the process for manufacturing carbon fibers, either ethylene gas, or acetylene gas, or mixture of ethylene gas and acetylene gas, is utilized as hydrocarbon gas.

Any of the hydrocarbon gas group becomes a raw material (source gas) for composing carbon fibers, and yet, by using a gas which mixed the above hydrocarbon gas with hydrogen gas, it is possible to facilitate growth of the carbon fibers.

Compared to the case of utilizing carbon monoxide or carbon dioxide, utilization of hydrocarbon dispenses with a need to critically consider a toxic effect.

To implement the present invention, applicable ethylene gas, acetylene gas, and hydrogen gas, are respectively diluted with inert gas component.

More particularly, compared to a case of utilizing pure ethylene gas, pure acetylene gas, and pure hydrogen gas, by way of utilizing the ethylene gas, acetylene gas, and hydrogen gas properly diluted with inert gas such as nitrogen, argon, and helium, potential hazard such as unwanted explosion can be restrained.

In the implementation of the present invention, it is featured that available ethylene gas is diluted into a concentration below 2.7 vol % corresponding to the lower limit of the explosive range thereof. Likewise, available acetylene gas is also diluted into such concentration below 2.5 vol % corresponding to the lower limit of the explosive range thereof. Likewise, available hydrogen gas is also diluted into such concentration below 4 vol % corresponding to the lower limit of the explosive range thereof.

By virtue of the above security arrangement, potential hazard of generating unwanted explosion can be restrained, and thus, there may be a case in which explosion-proof measure is not required. Accordingly, the above arrangement enables downsizing of the manufacturing facilities, whereby further saving cost.

In the implementation of the present invention, it is featured that inert gas is fed into the reaction vessel in conjunction with hydrocarbon gas and hydrogen gas.

As a result, it is possible to safely and readily control pressure inside the reaction vessel with inert gas without adversely affecting the yield of carbon fibers.

When implementing the present invention, it is featured that practically available pressure inside the reaction vessel ranges from $1 \times 1.333 \times 10^2$ Pa to $1000 \times 1.333 \times 10^2$ Pa, for example.

Based on the above arrangement, it is possible for the inventive method to produce carbon fibers under an extensive pressure range.

In particular, since it is possible to produce carbon fibers under $760 \times 1.333 \times 10^2$ Pa of atmospheric pressure, it is practically possible to produce carbon fibers at a low cost.

DETAILED DESCRIPTION OF THE PREFERRED EMBODIMENTS

Figure 1:
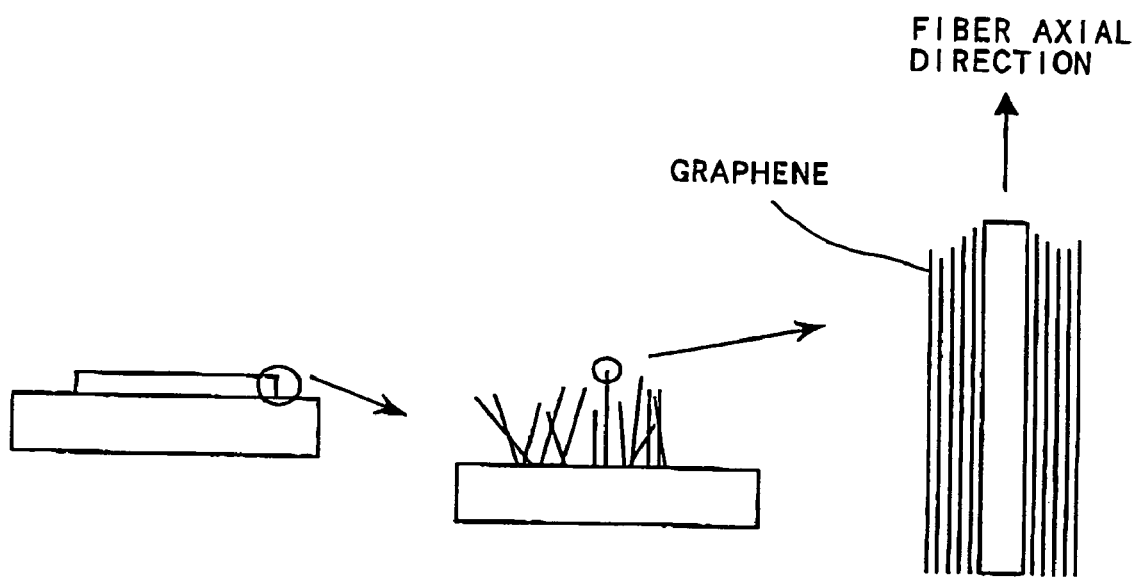
FIG. 1 presents a schematic cross-sectional view for showing a film comprising a number of carbon nanotubes.

Referring now to the accompanying drawings, a preferred embodiment of the present invention is described in detail below by way of exemplification. It should be understood however that, unless specifically described, the dimension, applied material, form, and relative arrangement, of component members described in embodiment are not solely limited to the scope of the present invention.

An identical reference numeral is given to such a component member shown in such a drawing that follows the preceding drawings showing an identical component member with an identical reference numeral therein.

The following description on the embodiment and examples of an electron emitting device according to the present invention is concurrent with the description on those of a method of manufacturing an electron emitting device, a method of manufacturing an electron source, a method of manufacturing an image display device, and a method of manufacturing carbon fibers according to the present invention.

In the description of the present invention, it is defined that a carbon fiber is a fibrous material mainly containing carbon. The term carbon fiber includes at least a "carbon nanotube", "graphite nanofiber", and "amorphous carbon fiber".

Figure 2:
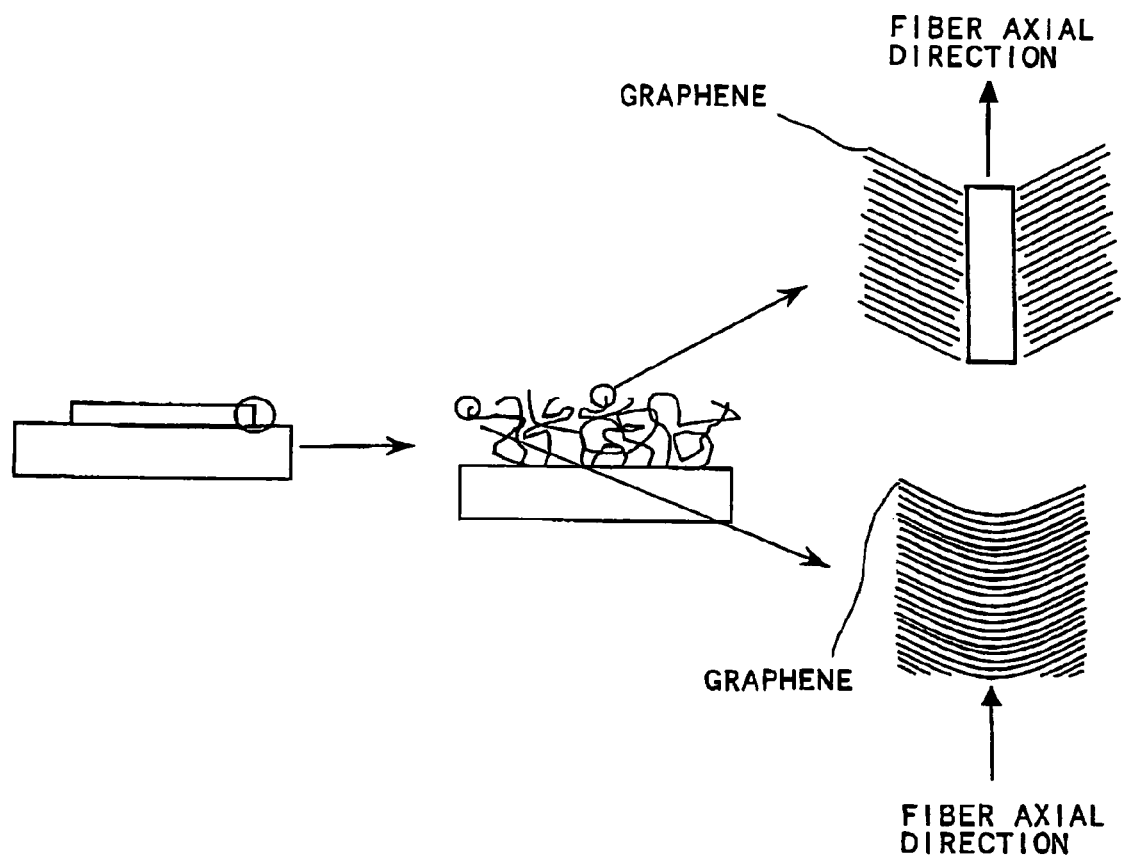
FIG. 2 presents a schematic cross-sectional view for showing a film comprising a number of graphite nanofibers.

FIGS. 1 and 2 respectively present schematic cross-sectional views of a film including a plurality of carbon fibers. In these drawings, one of the illustrations shown to the left exemplifies a form of carbon fibers visible via an optical microscopic level (up to 1000 times), the one shown in the center exemplifies a form of carbon fibers visible via a scanning electronic microscopic (SEM) level (up to 30000 times), and a form of carbon fibers visible via a transmission electronic microscopic (TEM) level (up to 1 million times) is exemplified in an illustration shown to the right.

The carbon fiber in which the graphenes form a cylindrical shape as shown in FIG. 1 is called a "carbon nanotube" (the fiber in which the graphenes forms a multiple-cylinder structure is called a "multi-wall nanotube"). Especially, in the case of the graphene having a structure in which the tube top is opened, the threshold voltage for electron emission is lowest.

FIG. 2 schematically exemplifies the "graphite nanofiber". Such carbon fiber comprising the laminate of graphenes (stacked graphens). More concretely, as shown in FIG. 2 via the illustration shown to the right, the "graphite nanofiber" comprise the fibrous material including graphenes laminated (stacked) in the longitudinal direction of the fiberous material (i.e., axial direction of fiber). Alternatively, as shown in FIG. 2 via an illustration shown to the right, the "graphite nanofiber" comprise the fibrous material, in which the graphenes are arranged in non-parallel to the axis of the fiber. Even when the graphenes are substantially orthogonal to the axial direction of the fibers, this case is also included in the "graphite nanofiber" of the present invention.

One sheet of graphite is called "graphene" or "graphene sheet". Graphite comprises plurality of stacked or layered carbon planes. Each carbon plane comprises a repeated hexagon having a carbon atom at each vertex thereof and having a covalent bond along each side thereof. The covalent bond is caused by sp2 hybrid orbitals of carbon atoms. Ideally, the distance (interval) between the neighboring carbon planes is maintained at 3.354 Å. One sheet of the carbon plane is called "graphene" or "graphene sheet".

As shown in FIG. 2, unlike the "carbon nanotube", the "graphite nanofiber" include extremely fine projections on its surface (i.e., on its side surface). Therefor an electric field is easily concentrated at the suraface of the graphite nanofiber, and thus, it is conceived that electrons can easily be emitted from the fiber. Furthermore, the graphenes included in the fiber are extend from the center axis of carbon fiber in the direction of external circumference (surface) of the fiber, it is conceived that electrons can easily be emitted. On the other hand, generally,the side surface of the "carbon nanotube" is chemically inert. Furthermore, unlike the "graphite nanofiber", the "carbon nanotube" has quite smooth side surface (projections are not exist on the side surface of the "carbon nanotube") Thus, it is conceived that the threshold voltage required for the electron emission from the side of the "carbon nanotube" is higher than that of the "graphite nanofiber". Because of this, application of the "graphite nanofiber" to the electron-emitting device (emitter) is more preferable than application of the "carbon nanotube" to the electron-emitting device (emitter).

For example, by utilizing the film comprising a plurality of the graphite nanofibers as an emitter, and then, by preparing an electrode (such as a gate electrode) for controlling emission of electrons from this emitter, an electron emitting device can be formed. Furthermore, by way of disposing a light emitting member capable of emitting light via irradiation of electrons on the orbit of emitted electrons, it is possible to form a light emitting device such as a lamp. Furthermore, by preparing an anode electrode including the light-emitting member such as a phosphor, and disposing a plurality of electron-emitting devices utilizing the films each comprising a plurality of the above graphite nanofibers, it is also possible to compose an image display device such as a display unit. In the case of the inventive electron emitting device, light emitting device, or the image display device according to the present invention, unlike a conventional electron emitting device, it is possible for the inventive devices to stably emit electrons without necessarily preserving the interior space at extremely high vacuum. Further, since the inventive electron emitting device according to the present invention stably emits electrons in presence of a low electric field, the invention can very easily manufacture highly reliable devices described above.

An embodiment of an Electron Emitting Device

The electron emitting device according to the present invention comprises a cathode electrode and a plurality of carbon fibers which are individually electrically connected to the cathode electrode. A mean diameter of the individual carbon fibers ranges from 10 nm to 100 nm. A standard deviation of a diameter distribution is equal to or less than 30% of the averaged diameter, preferably equal to or less than 15%. By way of utilizing a plurality of carbon fibers, the present invention realizes such an electron emitting device featuring distinguished characteristics in the emission of electrons and resistance against degradation.

The following description refers to an example of the electron emitting device of the present invention utilizing the most preferable graphite nanofibers among a variety of carbon fibers, while the description also refers to an example of the method of manufacturing thereof. As described above, to implement the present invention, it is also possible to utilize the above-described carbon nanotube as well.

To constitute such a substrate for growing the graphite nanofibers, a glass substrate, "PD200" available from Asahi Glass Co., Ltd., having a softening point of 830° C. and a distortion point of 570° C., may be utilized for example. It should be understood however that the substrate is not limited to the glass substrate exemplified above.

In as much as the graphite nanofibers for implementing the present invention are capable of growing themselves at a temperature of 500° C. or lower, no deformation occurs in the PD200 via exposure to a higher temperature.

An electroconductive film (cathode electrode), such as a film of titanium nitride, for feeding electrons to the carbon fibers is disposed on the above-described substrate. Utilization of nitride restrain oxidation of titanium at a high temperature, thereby it is possible to restrain degradation of electrical conductivity of the cathode electrode.

Next, a catalytic material to expedite growth of the carbon fibers is formed on the cathode electrode that is formed on the substrate. In this example, the thin film containing a palladium alloy or containing a palladium itself is formed. Sputtering or other conventional film forming method can be applied to the forming method of the film according to this invention. According to this invention, it is noted that The catalytic material is not limited to palladium.

When formulating the above alloy material comprising palladium, it is conceived that iron, copper, or nickel may be added to palladium.

Figure 3A:
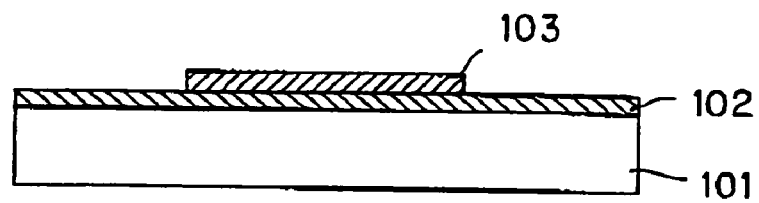
FIGS. 3A to 3C schematically show serial processes for manufacturing electron emitting members in the electron emitting device according to the present invention.
Figure 3B:
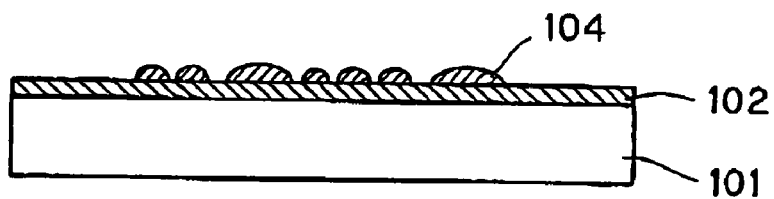
Figure 3C:
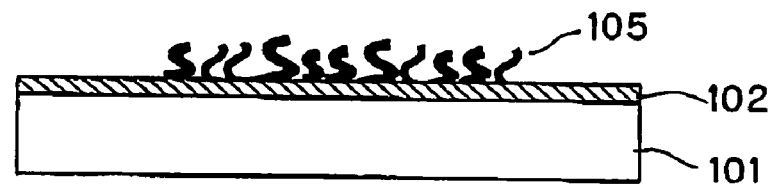

FIG. 3A schematically exemplifies a thin film 102 of titanium nitride formed on a glass substrate 101. In this example, the electrically conductive thin film (i.e., a cathode electrode) 102 comprising titanium nitride is formed on the glass substrate 101. Further, another thin film 103 comprising palladium thin film as a catalytic material is formed on the cathode electrode 102. FIGS. 3A to 3C schematically designates part of the processes for producing the electron emitting device of the present invention.

Figure 4:
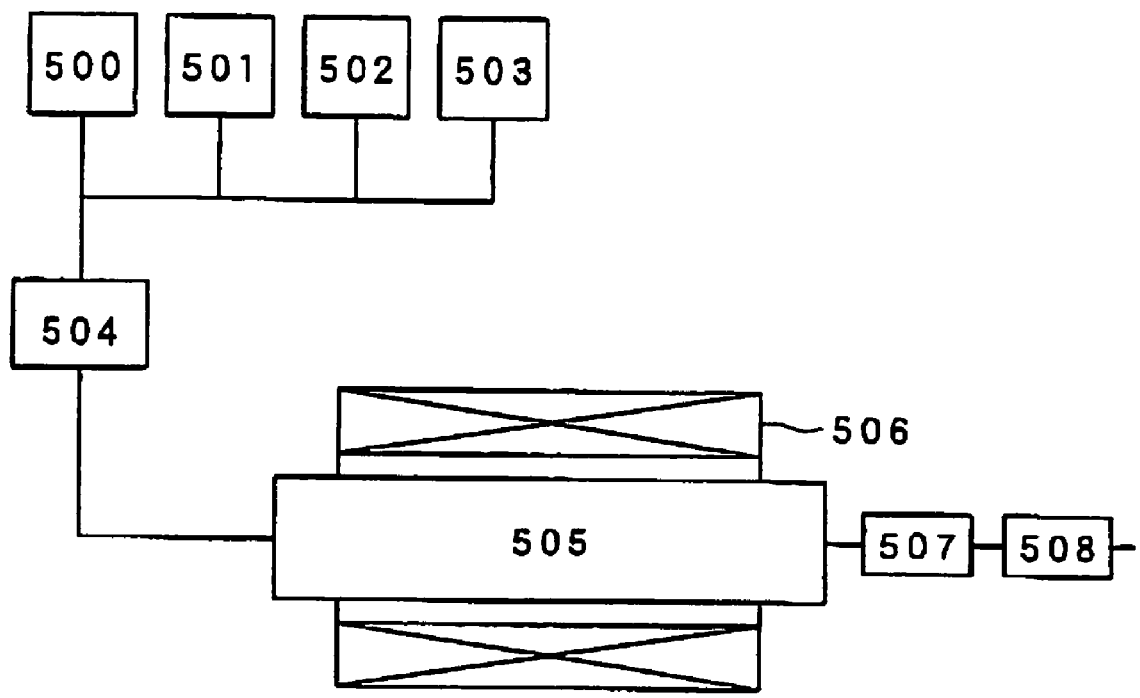
FIG. 4 presents a block diagram of an apparatus for producing electron emitting members in the electron emitting device according to the present invention.

FIG. 4 shows an apparatus for producing a carbon fiber material comprising a reaction vessel 505 and a gas-feeding system.

The temperature inside the reaction vessel 505 is properly controlled within a range from a room temperature to 1200° C. by means of a heater 506, a water cooling device (not shown), a thermocouple type thermometer (not shown), and a temperature controller (not shown).

The system for feeding gas components into the reaction vessel 505 comprises the following: a cylinder 500 for storing compressed acetylene gas (i.e., hydrocarbon gas) diluted with nitrogen gas into 1 vol % of concentration; a cylinder 501 for storing compressed ethylene gas (i.e., hydrocarbon gas) diluted with nitrogen gas into 1 vol % of concentration; a cylinder 502 for storing compressed hydrogen gas diluted with nitrogen gas into 2 vol % of concentration; a cylinder 503 for storing compressed pure nitrogen gas; and a gas flow meter 504 for properly controlling flow rate of the above-described gas components. The system for exhausting inside the reaction vessel 505 comprises a turbo-molecular pump 507 and a rotary pump 508.

In accordance with the above-described arrangement, a substrate superficially formed with a metallic palladium thin film is disposed inside the reaction vessel 505.

Initially, inside of the vessel 505 is exhausted via the turbo-molecular pump 507 and the rotary pump 508. Next, the temperature inside the reaction vessel 505 is raised within a range from 450° C. to 600° C. and then the temperature is held at an approximately constant level. Then, By executing the above processes, carbon fibers grow themselves on the substrate.

While raising temperature, as shown in FIG. 3B, the thin film 103 comprising the catalytic material will be converted into particles with a diameter of several nm to 100 nm and will be distributed, in the particle state, on the substrate.

While raising the temperature, hydrogen gas, hydrocarbon gas, and nitrogen gas are fed into the reaction vessel 505 from the cylinder 500 storing compressed acetylene gas diluted with nitrogen gas into 1 vol %, the cylinder 501 storing compressed ethylene gas diluted with nitrogen gas into 1 vol %, the cylinder 502 storing compressed hydrogen gas diluted with nitrogen gas into 2 vol %, and the cylinder 503 storing compressed pure nitrogen gas. While executing the gas feeding processes, being affected by the gas temperature, the diameter distribution of the graphite nanofibers grown on the substrate varies.

More particularly, in the case of simultaneously feeding hydrogen gas and hydrocarbon gas at a certain temperature close to the room temperature, a bundle of the graphite nanofibers, in other words, a film having a large number of graphite nanofibers, with small diameters and a narrow diameter distribution is formed.

Conversely, when feeding hydrogen gas or hydrocarbon gas at a high temperature, the diameters of the graphite nanofibers expand and the diameter distribution spreads.

Even when feeding either of hydrogen gas and hydrocarbon gas at a certain temperature close to the room temperature and the other one at a high temperature, the diameters of the graphite nanofibers also expand and the diameter distribution spreads as well.

Figure 5:
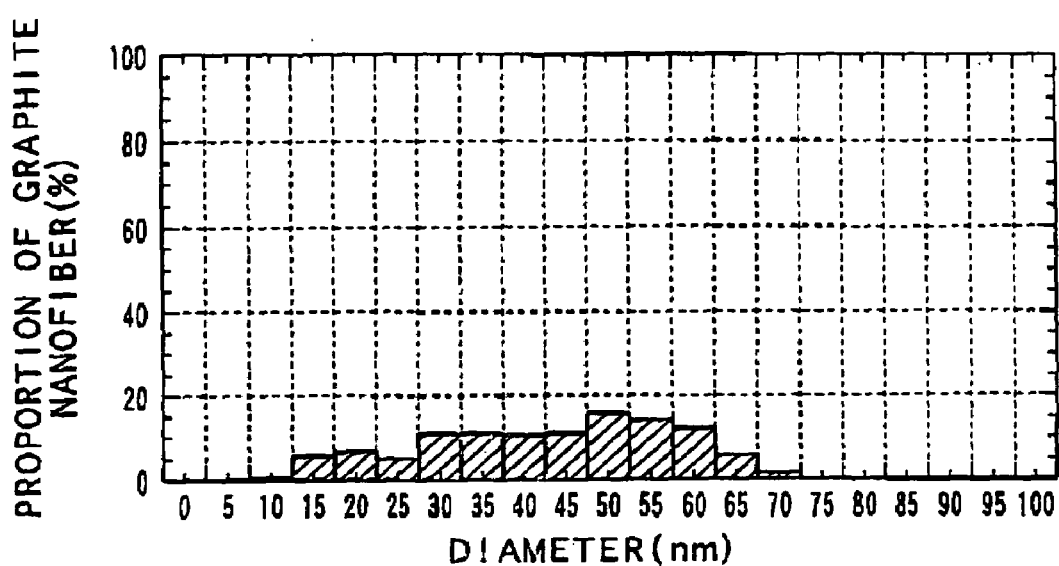
FIG. 5 presents a graphic chart for showing a diameter distribution of a bundle of graphite nanofibers.

In the case in which the diameters of the graphite nanofibers expand and the diameter distribution spreads, the diameter distribution looks like the one shown in FIG. 5. FIG. 5 represents a graphic chart for designating the diameter distribution of the bundle of the graphite nanofibers analyzed via observation of a sample with an electron microscope.

In the above-exemplified diameter distribution, the standard deviation is estimated at 14.35 nm and the mean diameter is estimated at 42.79 nm. In this case, the standard deviation against the mean diameter value was analyzed to be approximately 34%.

Figure 6:
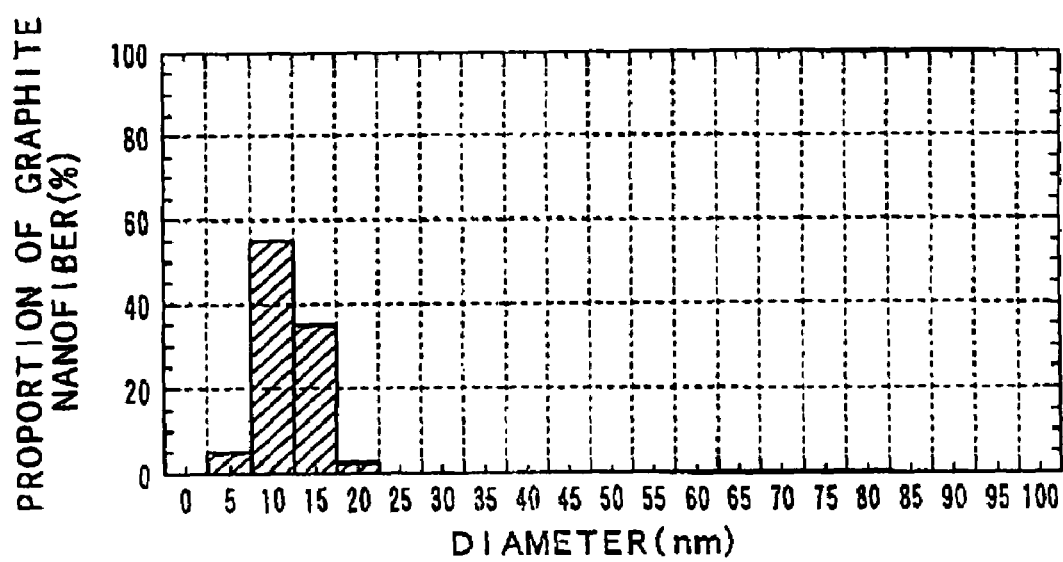
FIG. 6 presents a graphic chart for showing a diameter distribution of a bundle of graphite nanofibers produced in conformity with an embodiment of the method of manufacturing the electron emitting device according to the present invention.

On the other hand, in the case in which hydrogen gas and hydrocarbon gas are simultaneously fed into the reaction vessel 505 at a certain temperature close to the room temperature, the diameter distribution of the graphite nanofibers looks like the one shown in FIG. 6. FIG. 6 represents a graphical chart for designating the diameter distribution of the bundle of the graphite nanofibers produced in accordance with a an embodiment implementing the method of manufacturing the electron emitting device according to the present invention.

In the diameter distribution shown in FIG. 6, the standard deviation is estimated at 3.01 nm and the mean diameter is estimated at 11.75 nm. In the chart shown in FIG. 6, the mean diameter value is quite small, and yet, the width of the distribution is extremely narrow, where the standard deviation against the mean diameter value was analyzed to be approximately 26%.

Before feeding hydrocarbon gas and hydrogen gas into the reaction vessel 505, it is allowable to feed inert gas to fill pressure inside the reaction vessel 505 within a range from $5 \times 1.333 \times 10^2$ Pa to $1000 \times 1.333 \times 10^2$ Pa.

Even when setting the pressure range as described above, from the viewpoint of cost saving and preserving security, utilization of such a pressure close to $760 \times 1.333 \times 10^2$ Pa of the atmospheric pressure is preferable.

From the above characteristics, by way of varying temperature in the course of feeding hydrogen gas and hydrocarbon gas or properly arranging the temperature in the course of feeding hydrogen gas and hydrocarbon gas into the reaction vessel 505, it is possible to properly control the diameter distribution of the bundle of the graphite nanofibers.

After implementing the above serial processes, the reaction vessel 505 is cooled to the room temperature and then the whole serial processes are completed. After completing the whole serial processes, as shown in FIG. 3C, a carbon fiber material 105 comprising a bundle of the graphite nanofibers each having a controlled diameter and controlled diameter distribution is obtained on the substrate.

The above-described manufacturing method is also applicable to the carbon nanotubes. However, in the case of the carbon nanotubes, it is necessary to arrange the temperature for thermally decomposing hydrocarbon to be higher than the temperature applied to the formation of the graphite nanofibers. Except for this case, basically, the carbon nanotubes can be prepared by way of implementing those serial processes identical to the case of growing the graphite nanofibers.

The above description has exemplified the case of producing the carbon fibers connected to a cathode electrode by applying a vapor phase growing method (CVD method). However, it is also possible for the present invention to applying a method which initially prepares a plurality of carbon fibers within the above-described diametric range and then electrically connects those carbon fibers to the cathode electrode. Electrically and mechanically connecting a plurality of carbon fibers prepared in advance to the cathode electrode is possible as described below. For example, initially an ink (or a paste) comprising a liquid (as a solvent), an electrically conductive bonding agent and a plurality of carbon fibers (as a solute) having the diameters within the range described above is prepared. Subsequently, the ink (or a paste) is applied on the cathode electrode arranged on the substrate. Finally, via baking the substrate to which the ink (or a paste) was applied, the solvent and another organic matter included in the ink is vaporized and the fibers are connected to the cathode electrode through the electrically conductive bonding agent.

Figure 7A:
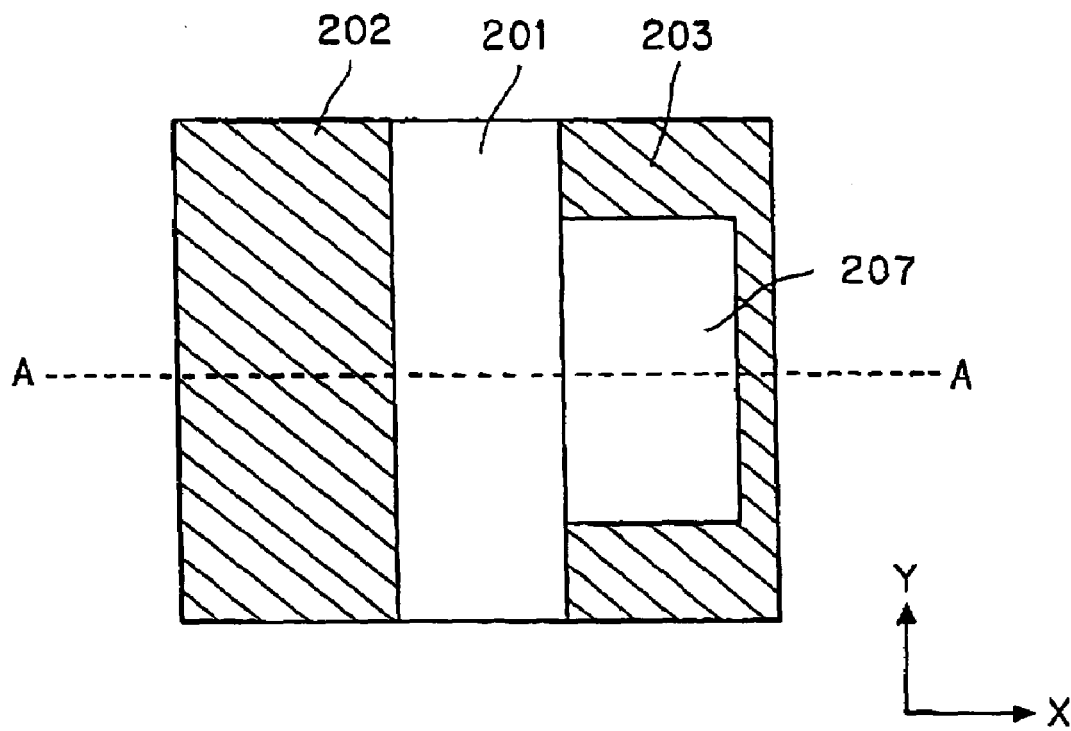
FIGS. 7A and 7B show a top view and a cross-sectional view of an electron emitting device of the present invention.
Figure 7B:
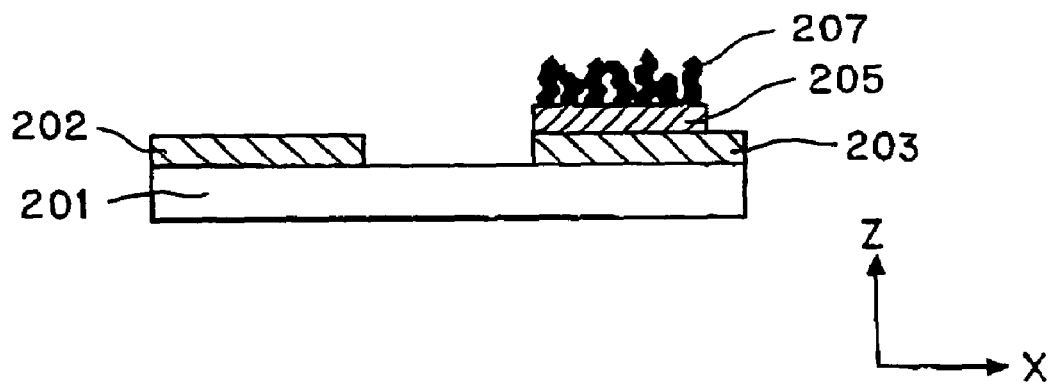
Figure 8:
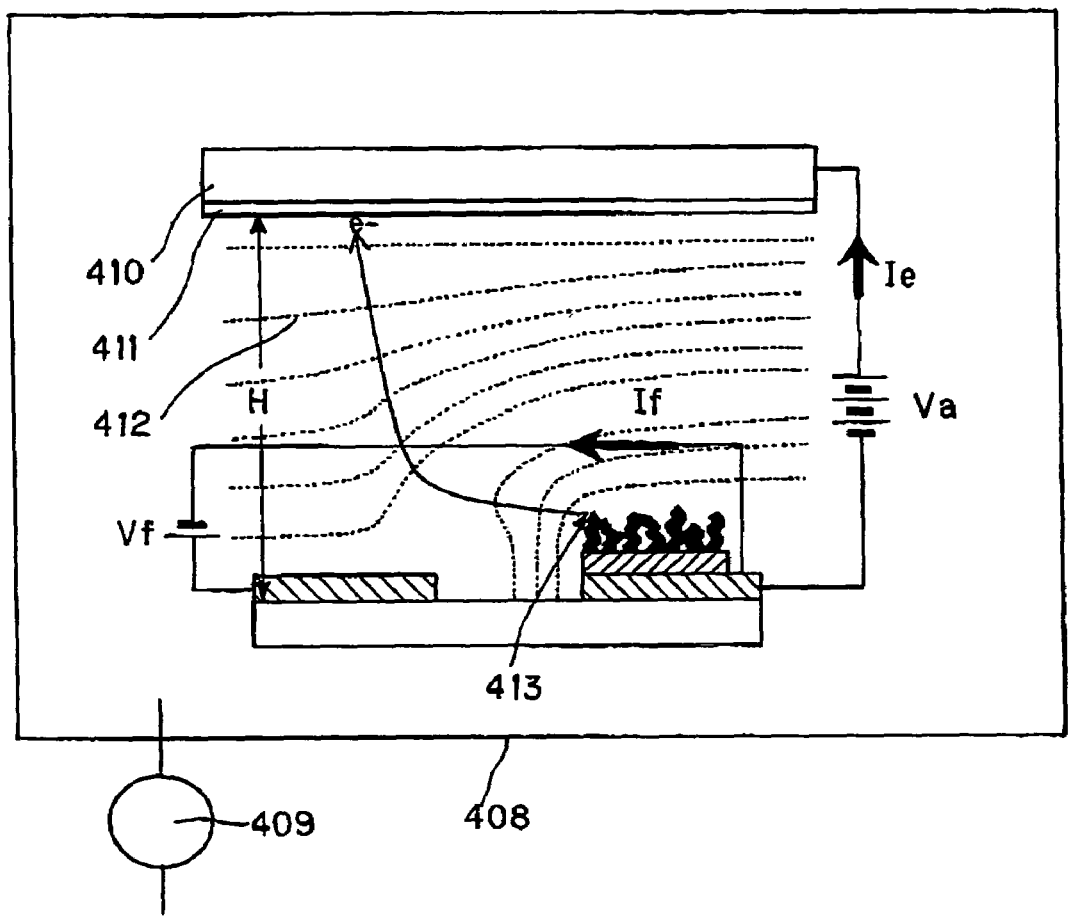
FIG. 8 shows an example of a structure in the course of operating an electron emitting device of the present invention.

Referring now to FIGS. 7A, 7B, and 8, an example of the inventive electron emitting device utilizing a number of carbon fibers as electron emitting members produced by applying the above method is described below.

FIGS. 7A and 7B present a plan view and a cross-sectional view of the electron emitting device of the present invention; in which FIG. 7A schematically shows an example of the constitution of the inventive electron emitting device. FIG. 7B presents a cross-sectional view of the above electron emitting device taken along the line A—A shown in FIG. 7A.

The reference numeral 201 shown in FIGS. 7A and 7B denotes an insulating substrate, 202 denotes a gate electrode, 203 denotes a cathode electrode, 207 denotes a carbon fiber material for composing an emitter, and 205 denotes a film of titanium nitride for constituting an electrically conductive material on which the carbon fiber material grows up via catalytic particles.

As the substrate 201, quart glass of which the surface is sufficiently rinsed, glass of which the content of impurities such as Na is reduced and which is partially substituted by K or the like, a laminate formed by laminating $SiO_2$ onto a substrate such as a soda lime glass or silicon substrate by sputtering or the like, and an insulating substrate made of alumina or ceramics are available.

The gate electrode 202 and the cathode electrode 203 are electro-conductive, and are formed by printing, generally-used vacuum film-forming techniques such as vapor deposition and sputtering, and photolithography.

Materials for the gate electrode 202 and the cathode electrode 203 are appropriately selected from, e.g., carbon, metals, metal nitrides, metal carbides, metal borides, semiconductors, and semiconductor metal compounds. The thickness of the above-described electrodes is set to be within the range of from several tenth nanometers to several tenth micrometers. Preferably, refractory materials, that is, carbon, metals, metal nitrides, and metal carbides are employed.

In case in which the thickness of the gate electrode 202 and the cathode 203 is small, which may undesirably cause the voltage drop, or in the case in which the devices are used in a matrix array, a metal material with a low resistance may be used as a wirings, if necessary.

In the electron emitting device of the present invention, in order to restrain a scattering electrons at the gate electrode 202, as shown in FIGS. 7A, 7B, and 8, it is preferred that such a plane including surface of the electron emitting members 207 and being substantially parallel with the surface of the substrate 201 is disposed at a position apart from the substrate surface and farther than that of the plane including part of the surface of the gate electrode 202 and being substantially parallel with the surface of the substrate 201. In other words, as shown in FIG. 8, in the electron emitting device of the present invention, the plane including part of the surface of the electron emitting members 207 and being substantially parallel with the surface of the substrate 201 is disposed between the plane including part of the surface of the gate electrode 202 and being substantially parallel with the surface of the substrate 201 and an anode electrode 411.

Further, in the electron emitting device of the present invention, a tip portion 413 of the electron emitting members 207 is disposed at a height(s) at which the emitted electrons are substantially prevented from scattering at the gate electrode 202, where the height(s) is defined by the distance between a plane including part of the surface of the gate electrode 202 and being substantially parallel with the surface of the substrate 201 and a plane including the surface of the electron emitting members 207 and being substantially parallel with the surface of the substrate 201.

The above-described height(s) is dependent upon the ratio of the vertical directional electric field with the horizontal directional electric field, where the ratio is defined by "the vertical directional electric field"/"the horizontal directional electric field". The greater the ratio thereof, the smaller the value of the height(s). In other words, the smaller the ratio, the higher the height(s) being required. In terms of a practical range, the height(s) is defined within a range from 10 nm to 10 μm.

The above-described term "horizontal directional electric field" may be defined as "an electric field existing in the direction being substantially parallel with the surface of the substrate 201". Alternatively, this may also be defined as "an electric field existing in the direction in which the gate electrode 202 oppositely faces the cathode electrode 203".

Likewise, the above-described term "vertical directional electric field" may be defined as "an electric field existing in the direction substantially orthogonal to the surface of the substrate 201". Alternatively, this may also be defined as "an electric field existing in the direction in which the substrate 201 oppositely faces the anode electrode 411".

Further, as shown in FIG. 8, in the electron emitting device of the present invention, by way of defining that the distance of a gap between the cathode electrode 203 and the gate electrode 202 is "d", a potential difference (i.e., voltage between the cathode electrode 203 and the gate electrode 202) when driving the electron emitting device is "Vf", distance between the anode electrode and the surface of the substrate 201 loaded with the electron emitting device is "H", and the potential difference between the anode electrode and the cathode electrode 203 is "Vb", it is such arranged that the value of the horizontal directional electric field while driving the electron emitting device (E1=Vf/d) is set within a range from 1 time to 50 times the value of E2=Va/H representing the value of the vertical direction electric field between the anode electrode and the cathode electrode.

By virtue of the above arrangement, it is possible to decrease a rate of causing electrons emitted from the cathode electrode 203 to collide with the gate electrode 202. As a result, it is possible to obtain electron emitting-device with high electron emission efficiency and focused electron beam emission ability.

Figure 9:
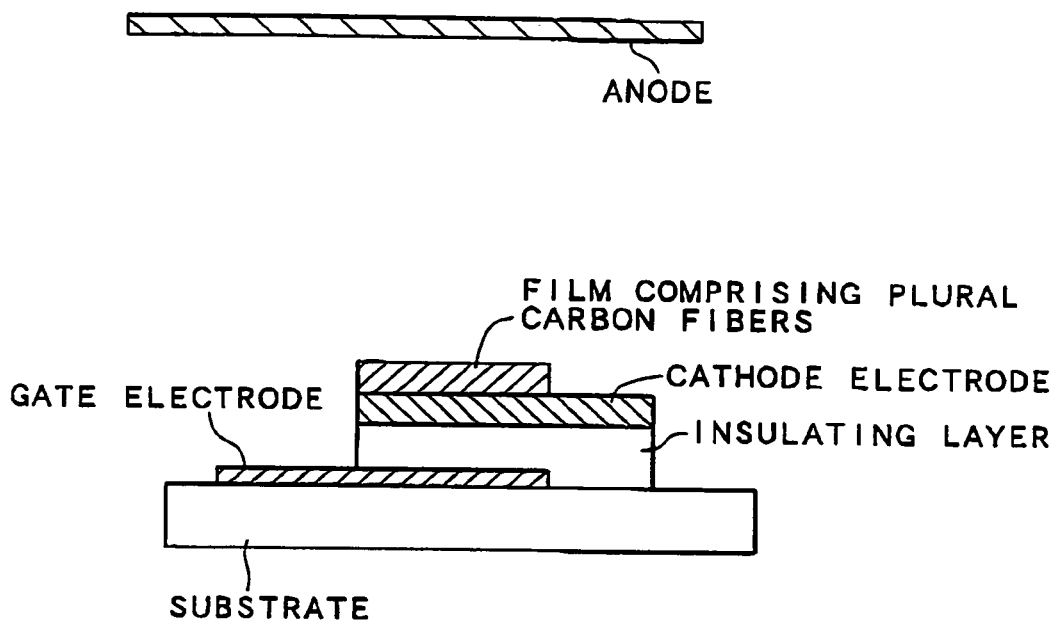
FIG. 9 shows an example of another mode of an electron emitting device utilizing a number of carbon fibers of the present invention.

As a variation example of the inventive electron emitting device shown in FIGS. 7A, 7B, and 8, the present invention further provides the electron emitting device as shown in FIG. 9. In FIG. 9, the insulating layer is disposed on a part of the gate electrode (the insulating layer overlaps a part of the gate electrode), and the cathode electrode and the film comprising a plurality of carbon fibers electrically connected to the cathode electrode are respectively disposed on the insulating layer. According to this configuraiton, inasmuch as the manufacturing work can be implemented more easily than the one shown in FIGS. 7A and 7B, and yet, because of available design freedom, the electron emitting device according to this variation model is preferable.

Figure 10:
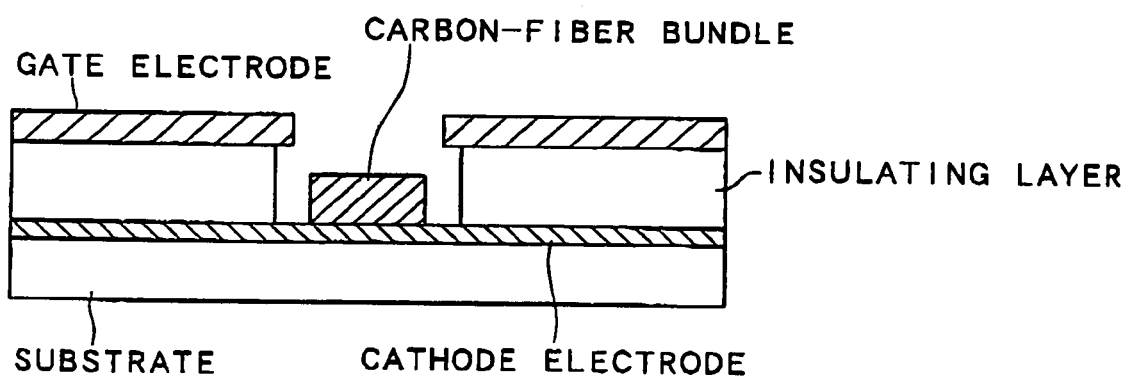
FIG. 10 shows an example of another mode of an electron emitting device utilizing a number of carbon fibers.

It should be understood that implementation modes of the electron emitting device according to the present invention are not limited to those shown in FIGS. 7A, 7B, and 9. For example, as shown in FIG. 10, such an arrangement is also practicable in which an insulating layer with an aperture and a gate electrode with an aperture are disposed on a cathode electrode, and an bundle of carbon fibers is disposed such that the carbon fibers can electrically be connected to a part of the cathode electrode exposed inside the apertures. However, from the viewpoint of ease of manufacturing and high electron emission efficiency, as shown in FIGS. 8 and 9, an implementation mode in which tip portions of carbon fibers are arranged so as to be closer to the anode electrode than to the gate electrode is more preferable. The above-described high efficiency in the emission of electrons can be expressed in terms of "current (Ie) flowing through the anode electrode/current (If) flowing between the cathode electrode and the gate electrode".

The electron emitting device of the present invention having a gap of several microns between the gate electrode 202 and the cathode electrode 203 was placed in a vacuum apparatus 408 shown in FIG. 8, and then the inside of the vacuum apparatus is exhausted until the inside of the the vacuum apparatus reaches $10^{-4}$ Pa via a vacuum evacuation device 409. FIG. 8 exemplifies a configuration employed when operating the electron emitting device according to the present invention.

Next, as shown in FIG. 8, an anode electrode 410 was provided at a height position H being several millimeters above a substrate surface, and then the anode electrode 410 was applied with a voltage Va ranging from 1 KV to 15 KV by a high-voltage power source.

In the example described herein, the anode 410 includes a phosphor film covered with an electrically conductive film.

When a pulse voltage being a drive voltage Vf (on the order of several tens V) is applied to the electron emitting device, electrons are emitted to generate an emission current Ie from the emitted electrons.

Electron-emitting characteristics of the electron emitting device, for example, deviation of the emission current Ie with respect to the driving voltage Vf, are greatly dependent on the physical shape of an electron emitting material, i.e., physical shapes of carbon fibers. Above all, inventors of the present invention discovered that diameter distribution of carbon fibers gravely affects electron emission characteristics. Insofar as diameters of individual carbon fibers are uniform, stable electron emission characteristics are obtained, and thus electrons are emitted within the surface of carbon fibers with high uniformity. Conversely, if the diameter distribution is broadly spread, the electron emitting characteristics are subject to variation within a short period of time, and degradation occurs with passage of time. In addition, uneven emission of electrons often occurs within the emitting surface thereof.

As a result of executing experiments under various different conditions, it was discovered that, if the standard deviation of the diameters of carbon fibers remains less than 30% from the mean diameter value, more preferably less than 15%, it was possible to secure stable electron emission characteristics.

Assume that the mean value of n numerical values (x(1), x(2), . . . x(n)) is a (this a is equal to ((x(1)+x(2)+ . . . +x(n))/n)), then, the standard deviation value(s) can be represented by an expression shown below.

$$S=[\{(x(1)-a)^2+(x(2)-a)^2+\cdots+(x(n)-a)^2\}/(n-1)]^{(1/2)}$$

In the present invention, in order to compute the above-described standard deviation value, it is necessary to measure actual diameters of individual carbon fibers. Insofar as high precision is secured, any measuring method may be utilized. For example, there is such a method in which an image of a bundle of carbon fibers is photographed by a scanning-type electronic microscope (which image is hereinafter referred to as the "SEM image"), and then, based on the photographed image, actual diameters of individual carbon fibers are measured. In this case, a plan-view SEM image of individual carbon fibers is photographed by applying such a magnification that would allow observation of each of the carbon fibers and accurate measurement of individual diameters thereof in order to collect statistical data related thereto. The term "plan-view SEM image" refers to an SEM image photographed from a direction substantially perpendicular to the surface of a substrate with a plurality(bundle) of carbon fibers (a film comprising a plurality of carbon fibers). Here, it is preferred to apply magnifications ranging from 100 thousands times to 500 thousands times for example. By applying magnifications within the range described above, it is possible to accurately measure actual diameters of individual carbon fibers based on the obtained SEM image. If it is not possible to photograph the whole of the bundle of carbon fibers (i.e., a film comprising a plurality of carbon fibers) all at once even when applying the above-suggested magnifications, it is suggested to photograph the SEM image by splitting them into plural parts so that the whole image can be photographed by applying the above-suggested magnifications. When taking a photograph of the plan-view SEM image, focus is pointed at a single piece of carbon fiber present on an upper portion of the film comprising a plurality of carbon fibers. This method can appropriately be utilized in the case of computing the above-described standard deviation with respect to a bundle of individually bending carbon fibers (i.e., a film comprising a plurality of carbons) such as graphite nanofibers.

In order to obtain the values of individual diameters of n units of carbon fibers "x(1), x(2), . . . x(n)" from the SEM image thus photographed, it is suggested to execute those processes specified below.

First, the above SEM image is split into plural, substantially uniform regions. Next, if there are p-pieces of discernible carbon fibers in one of the split regions, its diameter is measured, thereby obtaining "x(1), x(2), . . . x(p)". Next, if there were q-pieces of discernible carbon fibers in the next selected region, diameters of the p-pieces of carbon fibers are assumed to be "x(p+1), x(p+2), . . . x(p+q)". In the same way, diameters of carbon fibers are measured in all the split regions to obtain diameter values of individual carbon fibers present in the film comprising a plurality of carbon fibers as "x(1), x(2), . . . x(n)". In such a case in which the diameter of an individual carbon fiber subject to the measurement varies, a mean value between the maximum diameter and the minimum diameter that the carbon fiber takes within the photographed SEM image is determined to be the actual diameter value thereof.

On the other hand, in so-called carbon nanotubes, axes of individual fibers are substantially straight in many cases. Even in a bundle of carbon fibers, individual carbon fibers are oriented in the substantially identical direction. When measuring the diameters of individual carbon fibers in such a bundle of carbon fibers, a cross-sectional SEM image may be utilized. In this case, such a film comprising plural carbon fibers is cut into a plurality of samples so that individual cross-sections thereof will be in parallel with each other. It is desired that the individually cut samples will have as narrow width as possible. Next, a cross sectional SEM image is photographed with respect to each of the individual samples. Finally, evaluation processes are executed with respect to the individual SEM images in order to evaluate, on a strange line extending perpendicular to the oriented direction of individual carbon fibers, width of projections (bright regions) and recesses (dark regions) of gradations, and actual number of the projections (bright regions) and recesses (dark regions). By way of implementing the above-described processes, it is possible to precisely analyze the diameter distribution of individual carbon fibers.

Further, by disposing a number of the inventive electron emitting devices, and by providing a mechanism for controlling the amount of electrons emitted from individual electron emitting devices on the basis of data signal and by further providing a fluorescent unit functioning as an anode, the electron emitting device of the present invention can be applied to an image display device.

EXAMPLES

Next, by referring to examples, the present invention is described in further detail below.

Example 1

First, a thin film of titanium nitride was formed on a substrate PD200 (a product of Asahi Glass Co., Ltd., Tokyo, Japan) by applying an ion-beam sputtering process.

In this case, an alloy material comprising 90% of cobalt and 10% of palladium was used as catalytic metallic components.

Next, the above-described substrate was disposed on a uniformly heated region inside a reaction vessel 505 is shown in FIG. 4. Next, the reaction vessel 505 is evacuated until a pressure of $10^{-6} \times 1.333 \times 10^2$ Pa is reached, by applying a turbo-molecular pump 507 and a rotary pump 508.

As described earlier, a cylinder 502 stores compressed hydrogen gas diluted with nitrogen gas into 2 vol % of concentration. In the following step, the diluted hydrogen gas was fed from the cylinder 502 into the reaction vessel 505 via a gas flow meter 504 at room temperature and at a flow rate of 0.17 liter per minute. At the same time, ethylene gas diluted with nitrogen gas into 1 vol % of concentration was fed from the cylinder 501 into the reaction vessel 505 via the gas flow meter 505 at room temperature and at a flow rate of 0.34 liter per minute.

Next, by using a temperature controller, a heater unit 506 disposed at a location close to the reaction vessel 505, and a thermometer placed in a uniformly-heated region inside the reaction vessel 505, internal temperature was raised from room temperature, and maintained at 500° C. for an hour. It was detected that the internal temperature varied by less than 1% from 500° C. during the period of fired temperature.

Then, the internal temperature was cooled down to room temperature in approximately 20 minutes of cooling, by applying a water cooling device set in the neighborhood of the reaction vessel 505. Temperature at the uniformly heating region inside the reaction vessel 505 was measured with an R-thermocouple.

After completing the above processes, the upper surface of the substrate PD200 visually turned into black. It was found through observation with a scanning type electronic microscope that a fibrous material was formed on the substrate. After analyzing Raman spectrum and X-ray photo-electronic spectrum, it was confirmed that the above-described fibrous material was carbon.

It was further confirmed through transmission electronic microscopic observation that the above fibrous material was graphite nanofibers.

Also confirmed was that the above substrate PD200 was free from deformation due to heating during the above processes.

FIG. 6 is a graphic chart indicating the result of evaluating the diameter distribution of graphite nanofibers through analysis of the plan-view SEM photographic image of a bundle of the graphite nanofibers produced by executing the above-described serial processes.

From the above analysis, it was confirmed that the mean diameter value of individual graphite nanofibers in the bundle of the graphite nanofibers was 11.75 nm, and the standard deviation of the diameter distribution thereof was 3.01 nm. Therefore, the standard deviation from the mean diameter value is approximately 26%.

Figure 11:
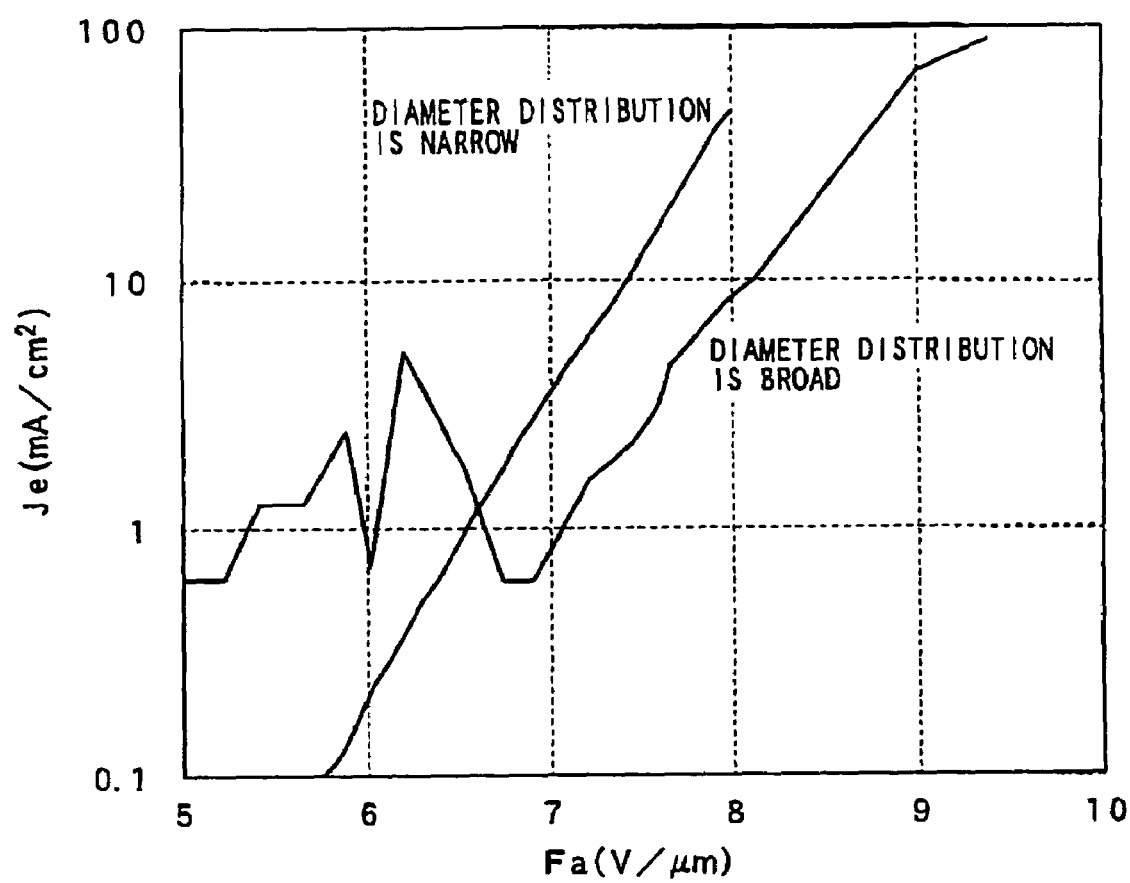
FIG. 11 shows electron emitting characteristics of the electron emitting device of the present invention.

FIG. 11 is a graphic chart indicating the relationship between applied voltages and, the characteristics of emitted current, in the inventive electron emitting device comprising a bundle of graphite nanofibers as electron emitting members. In a case in which the bundle of graphite nanofibers was grown on a cathode electrode over an area of several square millimeters, a gap of several hundreds of microns was provided between an anode electrode and the cathode electrode. By causing only the anode electrode to emit electrons, the relationship between the anode voltage Va and the emitted current Ie was measured. Intensity of electric field Fa obtained through division of the anode voltage Va by the gap between the anode electrode and the cathode electrode is indicated along the horizontal axis. On the other hand, current density Je obtained through division of the emitted current Ie by the area of the electron emitting portion is indicated along the vertical axis.

A plot indicated as "the diameter distribution is narrow" shown in FIG. 11 corresponds to a chart that represents the electron emitting characteristics of the inventive electron emitting device. The inventive electron emitting device proved to exhibit satisfactory characteristics such as a smooth rise-up property, with an electric-filed intensity of 6V/μm or slightly below as its threshold value. When the inventive electron emitting device was driven with a constant anode voltage Va, there was only a negligible decrease in the emitted current Ie.

Further, as shown in FIGS. 7A and 7B, when the inventive electron emitting device is added with a gate electrode and a drive voltage is applied between the gate electrode and the cathode electrode, tracks of those electrons emitted in the direction of the anode electrode were precisely controlled.

Likewise, after analyzing electron emitting characteristics by using an bundle of graphite nanofibers produced under slightly different conditions, it was proved that the resultant electron emitting characteristics were substantially identical to those previously obtained with respect to the above-described device. It was confirmed that those graphite nanofibers having uniform diameter distributions exhibited more stable electron emission characteristics. In particular, those graphite nanofibers exhibiting standard deviation of diameter which is 15% or less from the mean value had satisfactory electron emitting characteristics.

Based on the above result, it was confirmed that an electron emitting device comprising a bundle of graphite nanofibers as electron emitting members can provide an excellent electron emitting device which exhibits a low anode voltage at the electron emitting threshold value, quick rise of emitted current, and little degradation during long-term driving.

Reference Examples 1–3

In the same way as in Example 1, a substrate was prepared for depositing a bundle of graphite nanofibers thereon. Next, the substrate was set inside a reaction vessel, and the interior space of the reaction vessel was evacuated.

As in Example 1, an alloy material comprising 90 parts of cobalt and 10 parts of palladium was used as catalytic metal.

Three ways were used for feeding gas into the reaction vessel.

Comparative Example 1

A cylinder 502 stores compressed hydrogen gas diluted with nitrogen gas into 2 vol % of concentration. At room temperature, the diluted hydrogen gas was fed into a reaction vessel 505 from the cylinder 502 via a gas flow meter 504 at a flow rate of 0.17 liter per minute. While the interior temperature of the reaction vessel 505 was raised, at 300° C., ethylene gas diluted with nitrogen gas into 1 vol % of concentration was fed into the reaction vessel 505 from another cylinder 501 via the gas flow meter 504 at a flow rate of 0.34 liter per minute.

Comparative Example 2

A cylinder 502 stores compressed hydrogen gas diluted with nitrogen gas into 2 vol % of concentration. While the interior temperature of a reaction vessel 505 was raised, at 300° C., the diluted hydrogen gas was fed into a reaction vessel 505 from the cylinder 502 via a gas flow meter 504 at a flow rate of 0.17 liter per minute. In addition, while the interior temperature of the reaction vessel was raised, at 300° C., ethylene gas diluted with nitrogen gas into 1 vol % of concentration was fed into the reaction vessel 505 from another cylinder 501 via the gas flow meter 504 at a flow rate of 0.34 liter per minute.

Comparative Example 3

A cylinder 502 stores compressed hydrogen gas diluted with nitrogen gas into 2 vol % of concentration. While the interior temperature of a reaction vessel 505 was raised, at 300° C., the diluted hydrogen gas was fed into the reaction vessel 505 from the cylinder 502 via a gas flow meter 504 at a flow rate of 0.17 liter per minute. In addition, while the interior temperature of the reaction vessel 505 was raised, at 600° C., ethylene gas diluted with nitrogen gas into 1 vol % of concentration was fed into the reaction vessel 505 from the cylinder 501 via the gas flow meter 504 at a flow rate of 0.34 liter per minute.

After individually executing the above-described three methods, a bundle of graphite nanofibers was formed on the substrate PD200. However, individual graphite nanofibers formed had large diameters, thus causing the diameter distribution to spread extensively.

FIG. 5 exemplifies diameter distribution in the bundle of graphite nanofibers produced through the method described in comparative example 3.

In the diameter distribution shown in FIG. 5, the mean diameter value was 42.79 nm, whereas the value of the standard deviation was 14.35 nm. This means that the standard deviation becomes approximately 34% against the mean diameter value.

The plot indicated as "diameter distribution is broad" shown in FIG. 11 represents the result of evaluating electron emission characteristics of the bundle of graphite nanofibers produced in the above-described comparative example 3, in the same manner as in Example 1. In FIG. 11, the value of current density Je noticeably varies within a range in which intensity of applied electric field is from 5V to 7V/μm. This is due to a phenomenon in which an electron emitting point alternately appears and disappears in accordance with the rise of the intensity of electric field. Once disappeared, the electron emitting point never reappears. The electron emitting device has a threshold value of approximately 7V/μm. In correspondence with the rise of the intensity Fa of electric field, the current density Je rose while varying somewhat. Further, current Ie emitted while driving the electron emitting device under a constant anode voltage Va decreased apparently more quickly along with passage of time as compared to the case of Example 1. It was further noted that electron emitting points within the emitting surface were unevenly distributed.

Including the cases of the comparative examples 1 and 2, when diameter distribution is extensively spread, specifically, in such a case in which the standard deviation value of diameters exceeds 30% from the mean value, such tendencies as unstable electron emission characteristics, early occurrence of degradation, and uneven distribution of electron emitting points as described above were noticeably observed.

Example 2

In the same way as was done for Example 1, a substrate was prepared for growing a bundle of graphite nanofibers thereon.

As a catalytic metallic material, an alloy material comprising 50% of cobalt and 50% of palladium was prepared.

Then, the substrate was disposed inside a reaction vessel, and then the interior portion of the reaction vessel was evacuated.

Temperature for feeding hydrocarbon gas and hydrogen gas into the reaction vessel is the same as in Example 1.

Figure 12:
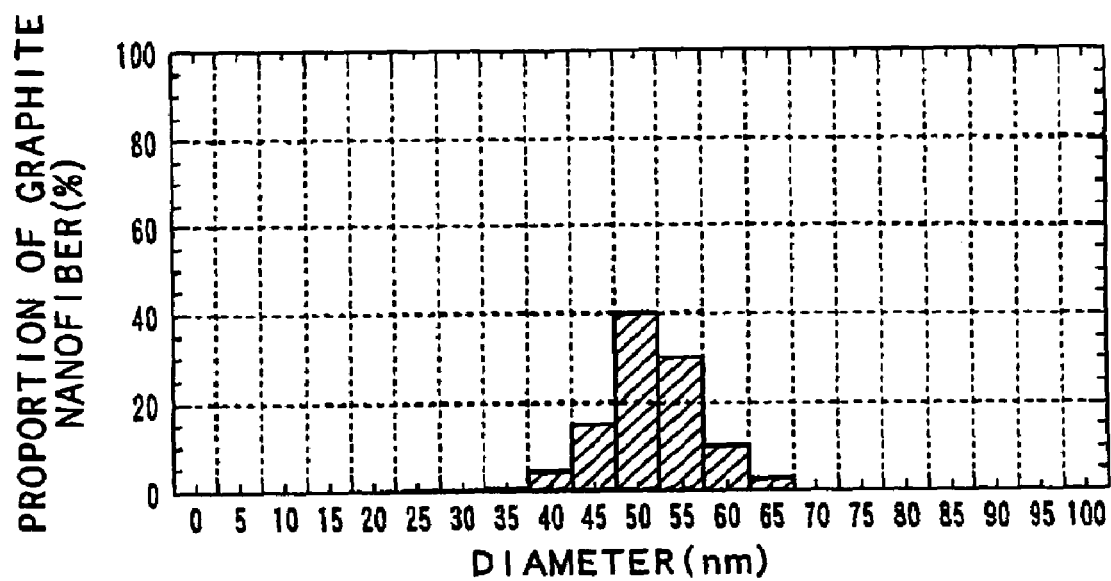
FIG. 12 presents a graphical chart for showing a diameter distribution of a bundle of graphite nanofibers produced in conformity with the method of manufacturing the electron emitting device of the present invention.

By applying the above-described method, a bundle of graphite nanofibers was formed on the substrate. Diameter distribution of the thus formed graphite nanofibers is shown in FIG. 12. FIG. 12 presents an analytical chart indicating diameter distribution of an bundle of graphite nanofibers produced by applying the method of manufacturing the inventive electron emitting device.

In the case of the diameter distribution shown in FIG. 12, the mean diameter value of the bundle of the graphite nanofibers was 51.24 nm, whereas the standard deviation value of the diameter distribution was 6.07 nm. Therefore, the standard deviation from the mean diameter value was about 12%.

Compared to the bundle of the graphite nanofibers used in Example 1, although the standard deviation is smaller relative to the mean diameter value, the mean diameter value increased.

After measuring the relationship between the applied voltage and the emitted current in the inventive electron emitting device that employs the above bundle of graphite nanofibers as the electron emitting members, the measured result was compared against the case of the bundle of graphite nanofibers produced in Example 1. Despite a slightly higher threshold voltage value in the electron emission, the electron emitting device according to Example 2 proved to be free from degradation even with long-term driving, and uniform electron emission was observed within the emitting surface. Therefore, the electron emitting device according to Example 2 is judged to have satisfactory electron emitting characteristics.

As described above in full details, the present invention has made it possible to manufacture an-electron emitting device which exhibits satisfactory electron emitting characteristics and suffers from little degradation.

Since the present invention has made it possible to produce the above-described electron emitting device at a temperature below softening point and distortion point of glass, it is possible to utilize a glass material as a substrate.

When implementing the present invention, hydrogen gas and hydrocarbon gas are respectively diluted with inert gas into a level below explosive range. Thus, provision of explosion-proof facilities is not necessary, and because of the case of production, the inventive electron emitting device is appropriate for mass production at a low cost.

Further, by applying the electron emitting device to an image display device, it is possible to realize an image display device that can be driven with a low voltage yet suffers from little degradation.

What is claimed is:

1. A method of manufacturing an electron emitting device comprising a plurality of carbon fibers, the method comprising the steps of:

disposing a substrate with a catalytic material inside a reaction vessel;

feeding hydrogen gas and hydrocarbon gas into the reaction vessel at a temperature close to a room temperature; and generating a plurality of carbon fibers by way of raising the temperature inside the reaction vessel, wherein the hydrocarbon gas contains a mixture of ethylene and acetylene gas, and wherein the ethylene gas and acetylene gas are individually diluted with inert gas.

2. A method according to claim 1, wherein a concentration of the ethylene gas diluted with inert gas is less than 2.7 vol %.

3. A method according to claim 1, wherein a concentration of the acetylene gas diluted with inert gas is less than 2.5 vol %.

* * * * *

UNITED STATES PATENT AND TRADEMARK OFFICE
CERTIFICATE OF CORRECTION

PATENT NO. : 7,094,123 B2
APPLICATION NO. : 11/050590
DATED : August 22, 2006
INVENTOR(S) : Kazunari Oyama et al.

It is certified that error appears in the above-identified patent and that said Letters Patent is hereby corrected as shown below:

COLUMN 4

Line 28, "potential" should read --a potential--; "as" should read --as an--;
    Line 39, "potential" should read --the potential--; and
    Line 40, "generating" should read --generating an--.

COLUMN 6

Line 33, "include" should read --includes--;
    Line 41, "generally,the" should read --generally, the--;
    Line 43, "has" should read --has a--; and
    Line 44, "are" should read --do--.

COLUMN 7

Line 35, "In as much" should read --Inasmuch--;
    Line 49, "method" should read --methods--;
    Line 51, "The" should read --the--; and
    Line 63, "designates" should read --designate--.

COLUMN 8

Line 22, "inside" should read --the inside"; and
    Line 27, "By" should read --by--.

COLUMN 13

Line 64, "cross sectional" should read --cross-sectional--.

UNITED STATES PATENT AND TRADEMARK OFFICE
CERTIFICATE OF CORRECTION

PATENT NO. : 7,094,123 B2
APPLICATION NO. : 11/050590
DATED : August 22, 2006
INVENTOR(S) : Kazunari Oyama et al.

It is certified that error appears in the above-identified patent and that said Letters Patent is hereby corrected as shown below:

<u>COLUMN 18</u>

Line 15, "an-electron" should read --an electron--.

Signed and Sealed this

Twenty-seventh Day of March, 2007

JON W. DUDAS
*Director of the United States Patent and Trademark Office*